United States Patent [19]

Vermoortele et al.

[11] Patent Number: 5,413,632
[45] Date of Patent: May 9, 1995

[54] ORGANIC PIGMENTS, PROCESS FOR THEIR PREPARATION AND USE IN PAINTS

[75] Inventors: Frank Vermoortele, Lille; Jean Mayer, Hem, both of France

[73] Assignee: Colour Research Company (CORECO) Ltd., Dublin, Ireland

[21] Appl. No.: 946,447

[22] PCT Filed: Mar. 14, 1991

[86] PCT No.: PCT/BE91/00019
§ 371 Date: Oct. 19, 1993
§ 102(e) Date: Oct. 19, 1992

[87] PCT Pub. No.: WO91/13943
PCT Pub. Date: Sep. 19, 1991

[30] Foreign Application Priority Data

Mar. 14, 1990 [BE] Belgium .................. 9000287

[51] Int. Cl.⁶ .............................. C09B 67/10
[52] U.S. Cl. ..................... 106/493; 106/412; 106/499; 524/612
[58] Field of Search ............ 106/493, 412, 282.26, 106/499; 524/612

[56] References Cited

U.S. PATENT DOCUMENTS

| | | | |
|---|---|---|---|
| 3,991,044 | 11/1976 | Conley | 106/228 Q |
| 4,595,417 | 6/1986 | Murakami et al. | 106/412 |
| 5,034,508 | 7/1991 | Nishizaki et al. | 106/287.26 |

FOREIGN PATENT DOCUMENTS

| | | |
|---|---|---|
| 0070490 | 1/1983 | European Pat. Off. |
| 0227443 | 7/1987 | European Pat. Off. |
| 2214730 | 8/1974 | France . |
| 59-19530 | 2/1984 | Japan . |
| 60-119279 | 6/1985 | Japan . |

*Primary Examiner*—Mark L. Bell
*Assistant Examiner*—C. M. Bonner
*Attorney, Agent, or Firm*—Merchant, Gould, Smith, Edell, Welter & Schmidt

[57] ABSTRACT

The invention relates to an organic pigment, preferably an azoic pigment, characterized in that it has been treated with polyalkylene imine with a view to improving its characteristics when used in painting. This treatment can be carried out both on an organic pigment treated by known methods and on an untreated pigment. A treated pigment is generally preferred, however, particularly if maximum opacity is desired.

6 Claims, No Drawings

ORGANIC PIGMENTS, PROCESS FOR THEIR PREPARATION AND USE IN PAINTS

SUBJECT MATTER OF THE INVENTION

The present invention relates to pigments exhibiting improved properties, especially gloss and fastness. The invention also relates to a process which makes it possible to obtain such pigments and to their use in paints.

SUMMARY OF THE STATE OF THE ART

Organic pigments, in particular azo pigments, find a wide application in the paint industry. The advantage of these pigments is the wide color range which they permit and their moderate cost in the case of a high coloring power. However, they generally have an opacity which is too weak to be employed by themselves, and insufficient fastness.

Techniques for increasing their opacity are known in the case of these pigments; such treatments consist especially in heating in the presence of a solvent or in an aqueous medium at a high temperature; these treatments can especially be accompanied by a purification in an alkaline medium. Such treatments are described, for example, in the following patents: DE-3 128 057 FR-2 214 730, FR-2 117 428, FR-2 432 578, U.S. Pat. No. 3,991,044.

However, these products have certain disadvantages; the lack of gloss and the tendency to flocculation or to floating may be mentioned in particular. Finally, their fastness to light and to inclement weather (especially to the sulphur dioxide present in industrial atmospheres), while generally improved by the abovementioned treatments, frequently remain still insufficient for use in high-performance paints such as, for example, those intended for car bodywork.

OBJECTIVES OF THE INVENTION

The present invention is therefore aimed at improving the properties of organic pigments, especially of azo pigments, in paints, especially gloss, resistance to flocculation or floating and fastness to light and to inclement weather.

Characteristic features of the invention and technological background

The invention relates to an organic pigments, preferably an azo pigment, characterized in that it has been treated, with a view to improving its paint characteristics with the aid of polyalkyleneimine. This treatment can be performed both on an organic pigment otherwise treated using knownmethods and on an untreated pigment. However, it is generally preferred to employ a treated pigment, particularly when a maximum capacity is sought.

The treatment technique to be used will be described in greater detail below, as will the use of the abovementioned products in paints.

Among the polyalkyleneimines, polyethyleneimine (homopolymer of aziridine) is a commercial product employed especially in the paper industry as dispersing agent for fillers and inorganic pigments and to increase resistance to water.

It is also employed as an adhesion promoter in printing inks and has also been proposed for treating siliceous fillers in vulcanization processes described in U.S. Pat. No. 3,953,223 and for treating carbon black with a view to increasing the selective adsorption of $CO_2$, that is to say modifying the active nature of this product as indicated in documents U.S. Pat. No. 4,771,089 and JP-63 259 927.

Finally, products of reaction of polyethyleneimine with other polymers have been proposed as dispersing agents.

However, these uses did not make it possible to foresee that this product was capable of treating organic pigments and improving their properties. Quite to the contrary, a manufacturing company (BASF) advises against its use in inks when the latter contain certain azo pigments which include Pigment Red 48:4 of the Color Index, which forms the subject of examples 1 to 5 below, (see BASF notice: ref. Ti/P 3052 d: "Polymin(R) Wasserfrei": Technische Information, BASF September 1988).

In addition, polyethyleneimine is in most cases incompatible with paints containing solvents and its addition at the time of the milling of the pigments or the finished paint does not in any way yield the results indicated below.

Polyethyleneimine is a commercial product sold especially under the trademarks "Polymin" of the company BASF, "Epomin" of the company Nippon Shokubai, or "Corcoat" of the company Hoechst Celanese.

These products appear in various grades, which differ chiefly in their degree of polymerization: according to the invention, products of average molecular masses which are higher than 600 are employed, preferably between 1000 and 70 000.

The higher homologs of the polyakyleneimine series are not, so far as the Applicant Company is aware, marketed, but can be obtained by analogy with the processes for obtaining polyethyleneimine; in particular polyropyleneimine can be obtained by the process described in: "Preparation and polymerisation of D- and L-Propylene-imine and N-Methyl propylene-imine" by Yuji Minoura, Matsuji Takebayashi and Charles C. Price, Journal of American Chemical Society, vol 81 (1959) p. 4689.

In the case of the use of the polyalkyleneimines according to the invention with a view to the treatment of pigments, a preferred technique consists in adding the polyalkyleneimine in aqueous solution to an aqueous suspension of pigment before the latter is isolated and dried by conventional means.

The quantity of polyalkyleneimine used may vary from 0.1 to 10% by weight relative to the pigment, preferably from 0.2 to 6%.

As has been indicated above, the pigments used may have advantageously been subjected to a pretreatment according to known techniques. Similarly, the products according to the invention may contain or may have been in contact with additives which are traditionally employed in the paint industry, such as surfactants, resins, metal resinates and the like; these additives may be added at any stage of the manufacture of the product.

By way of illustration of particularly advantageous compounds which may find an application in the technique of the invention, there may be mentioned metal lake (salt) azo pigments such as Pigment Red 48:4 (manganese lake) of the Color Index (C.I. No. 15865:4), and the pigments derived from (4,4'-diamino-3,3'-dichlorodiphenyl).

The invention will be described in greater detail with the aid of the following examples.

Method of examination of the organic pigments in stove paint (Alkyd-melamine)

1. Paint production

The following mixture (% by weight) is produced:
72.35% of Setal 84 XX 70 with a solids content of 70%, alkyd resin from the company Synthese
27.65% of Setamine US135 with a solids content of 60%, melamine resin from the same company. 2.4 g of pigment are dispersed in 6.3 g of this binder with the addition of 6.3 g of the following solvent mixture: (by weight)
Xylene: 70%
Butanol: 17.5%
Ethylglycol: 12.5%

The dispersion can be produced in 30 min with the aid of a "Red Devil" apparatus, with the addition of 30 g of 3-mm diameter glass beads.

After the dispersion has been checked with the North gage (10 μm) the dispersion is stabilized by the addition of 15 g of binder and homogenization.

The tests are carried out on color which is pure and toned down with a white paint of the same kind pigmented at a concentration of 25 % with rutile titanium oxide of the RCR2 type from the company Tioxide, in the proportions of
1 part of organic pigment
9 parts of titanium oxide.

2. Paint application

The pure or toned down paint is applied onto a contrast board and onto an aluminum panel coated with a protective finish (for the $SO_2$ tests), with the aid of a No. 7 spiral (bar-coater) applicator, corresponding to a liquid film with a thickness of 75 μm. The applications are then crosslinked by baking in an oven at 130° C. for 30 min.

3. Description of the tests carried out

Opacity:
Comparative visual inspection of the pure applications on a contrast board; measurement of the hiding power in the wet state with a Pfund cryptometer, (in $m_2/g$ Gloss:
Visual evaluation and evaluation by measurement with the aid of a glossmeter, at an angle of incidence of 20° C.

Flocculation or floating:
Evaluation before baking by the "Rub-out" test on the toned-down application.

Rheology:
The rheological behavior of the liquid paints is assessed with the aid of a "Lefranc" flow-type viscometer by measuring the distance of the flow of paint in a given time: this behavior is proportionately more favorable the greater the distance.

$SO_2$ resistance:
Evaluated by the "Kesternich" test (AFNOR standard NFT 30055 - ISO 3231) on aluminum panels (pure color). The differences between the exposed parts after 6 cycles and unexposed parts are evaluated visually by comparing the toning down with that of a standard range (ladder of grays), the score of 5 denoting maximum fastness (no change).

Ultraviolet resistance:
The aluminum panels (pure color) are exposed in a QUV Accelerated Weathering Tester (Q-Panel Company) apparatus for 150 hours at 45° C., without condensation, parts 280–315 nm UVB lamps. The gloss and the colorimetric difference between the exposed and unexposed parts are measured (delta E CIELAB, D65 illuminant, 0°/scatter geometry).

Example 1. (for reference)

A suspension of 45 g of Pigment Red 48:4 of the Color Index is prepared by coupling 22.15 g of conventionally diazotized 3-chloro-4-methylaniline-6-sulfonic acid with 17.86 g of 2-hydroxy-3-naphthoic acid in the presence of sodium hydroxide, followed by the addition of 21.18 g of manganese chloride hydrate $MnCl_2.4H_2O$. The mixture is heated to 85° C., kept at this temperature for 30 min, filtered, washed until the inorganic salts have been removed, and dried.

Example 2. (according to the invention)

The procedure is as in Example 1, but after filtration and washing the product is returned to paste form by adding water up to a volume of 750 ml.

A solution of 1.44 g of "Polymin wasserfrei" from the company BASF in 50 ml of water is then added with stirring. After stirring for 15 min more, the product is filtered off, washed with 500 ml of water and dried.

Example 3. (for reference, opacified product)

The procedure is as in Example 1, but after filtration and washing the material is restored to paste form in water up to a volume of 750 ml. After homogenization the suspension is introduced into a 1-liter autoclave and is heated up to 160° C. over 1 h. It is kept at this temperature for 1 h, then cooled and filtered, washed and dried.

Example 4. (according to the invention)

The procedure is as in Example 3, but after leaving the autoclave, the product is taken up and a solution of 1.44 g of "Polymin wasserfrei" from the company BASF in 50 ml of water is added with stirring. After stirring for 15 min more, the product is filtered off, washed with 500 ml of water and dried.

Application of the pigments of Examples 1 to 4 in paint according to the methods described gives the following results:

| TESTS | Example 1 | Example 2 | Example 3 | Example 4 |
|---|---|---|---|---|
| Opacity: | | | | |
| - wet $m^2/l$ | 6.8 | 6.8 | 9.5 | 10.2 |
| - dry | weak | +transp. | medium | high |
| Gloss: - % (at 20° C.) | 73% | 75% | 68% | 75% |
| (on board) - visual | haze | good | haze | good |
| Rheology: | | | | |
| flow | 8.5 cm | 16 cm | 14 cm | 18 cm |
| distance | (bad) | (medium) | (medium) | (good) |
| Rub-out: | bad | good | bad | good |
| Resistance to $SO_2$ | 1–2 | 4 | 2 | 4 |

| TESTS | | Example 1 | Example 2 | Example 3 | Example 4 |
|---|---|---|---|---|---|
| after 6 cycles ladd. of grays | | | | | |
| U.V. resistance | 20° Gloss: -before exp. | 80% | 82% | 75.5% | 90% |
| | -after exp. | 58.5% | 80% | 45% | 89% |
| | Delta E | 0.81 | 0.74 | 4.80 | 0.94 |

Example 5. (according to the invention)

The procedure is in Example 4, but with the "polymin Wasserfrei" replaced by the same quantity of polypropyleneimine prepared according to the reference cited on page 3 (YuJi Minoura et al.)

A product whose properties are very close to those of Example 4 is obtained.

Example 6. (for reference)

A suspension of 45 g of Pigment Yellow 170 of the Color Index is prepared by coupling 16.57 g of conventionally tetraazotized 4,4'-diamino-3,3'-dichlorodiphenyl with 27.66 g of 4'-methoxyacetoacetanilide at a pH of between 5.2 and 4. The mixture is heated to 95° C., kept at this temperature for 1 h, filtered and washed until the inorganic salts have been removed. The product is returned to paste form with stirring by adding water up to a volume of 750 ml and the pH is increased to 12 by addition of a sufficient quantity of sodium hydroxide.

After homogenization, the suspension is introduced into an autoclave and is heated up to 180° C. over 1 h. It is kept at this temperature for 1 h and is then cooled to about 60° C. The pigment is in its beta (red-dish) crystalline form. A solution of 1.68 g of "Staybelite resin" from the company Hercules, dissolved in 100 ml of water with 0.2 g of sodium hydroxide, is added. The product is filtered off, washed with 1500 ml of water and dried.

Example 7. (according to the invention)

The procedure is as in Example 6, but after leaving the autoclave, at about 60° C., the product is taken up and a solution of 1.44 g of "Polymin wasserfrei" from the company BASF in 50 ml of water is added with stirring. The material is stirred for 15 min and a solution of 1.68 g of "Staybelite resin" from the company Hercules, dissolved in 100 ml of water with 0.2 g of sodium hydroxide, is added. The product is filtered off, washed with 1500 ml of water and dried.

The application of the pigments of Examples 6 and 7 in paint according to the methods described gives the following results:

| Tests | | Example 5 | Example 6 |
|---|---|---|---|
| Opacity: | | | |
| - wet m²/l | | 8.4 | 9.5 |
| - dry | | medium | superior |
| Gloss: - % (at 20°) | | 72.8 | 81 |
| (on board) - visual | | haze | good |
| Rheology: | | | |
| flow distance | | 13.8 cm | 14.3 cm |
| U.V. resistance | 20° gloss: -before exp. | 70 | 82 |
| | -after exp. | 54 | 72 |
| | Delta E | 4.4 | 2.8 |

We claim:

1. Pigment-based coating composition characterized in that the pigment has been treated with 0.1 to 10% by weight of polyalkyleneimine in relation to the pigment.

2. A coating composition according to claim 1, characterized in that the pigment has been treated with 0.2 to 6% by weight of polyalkyleneimine in relation to the pigment.

3. A coating composition according to claim 1, characterized in that the polyalkyleneimine is polyethyleneimine or polypropyleneimine.

4. A coating composition according to claim 3 containing an additive selected from the group consisting essentially of surfactants, resins, metal resinates and mixtures thereof.

5. A coating composition according to claim 1 wherein:
   (a) the polyalkyleneimine component has an average molecular mass of greater than 600.

6. A coating composition according to claim 5 wherein:
   (a) the polyalkyleneimine component has a molecular mass within the range of 1,000–70,000.

* * * * *

UNITED STATES PATENT AND TRADEMARK OFFICE
CERTIFICATE OF CORRECTION

PATENT NO. : 5,413,632

DATED : May 9, 1995

INVENTOR(S) : Vermoortele, et al.

It is certified that error appears in the above-identified patent and that said Letters Patent is hereby corrected as shown below:

Title Page:
At [86] § 371 Date:, the year "1993" should read --1992--.

At col. 1, line 52, "knownmethods" should read --known methods--.

At col. 2, line 32, "polyakyleneimine" should read --polyalkyleneimine--.

At col. 2, line 35, "polyropyleneimine" should read --polypropyleneimine--.

Signed and Sealed this

Seventeenth Day of October, 1995

*Attest:*

BRUCE LEHMAN

*Attesting Officer*   *Commissioner of Patents and Trademarks*